//d States Patent Office 3,207,752
Patented Sept. 21, 1965

3,207,752
PROCESS FOR THE PREPARATION OF 2α-METH-YL-ANDROSTANE DERIVATIVES
Pietro de Ruggieri, Milan, Italy, assignor to Ormonoterapia Richter S.p.A., Milan, Italy
No Drawing. Filed Jan. 29, 1962, Ser. No. 169,625
Claims priority, application Italy, Nov. 23, 1961, 21,076/61
12 Claims. (Cl. 260—239.55)

The object of this invention is the preparation of 2α-methyl-androstane derivatives that can be represented by the following general formula:

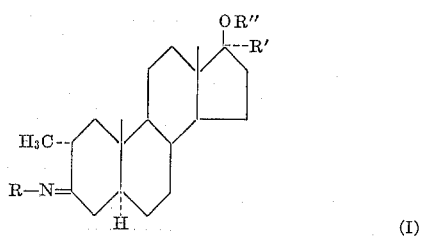

where R is a member selected from the group consisting of —NH$_2$,

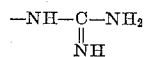

and

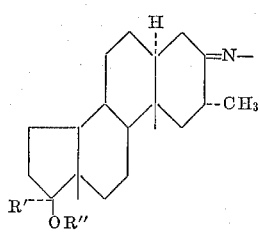

R' is a member selected from the group consisting of —H and —CH$_3$, and R'' is a member selected from the group consisting of —H, an aliphatic acyl radical containing from 2 to 10 C atoms, and of the new intermediates in the preparation of these compounds.

These products are therapeutically useful because of their low androgenic power and high anabolic value. They are described in the copending applications, Serial Nos. 145,481 (filed October 16, 1961), now U.S. Patent No. 3,069,414, and 166,952 (filed January 17, 1962), now U.S. Patent No. 3,062,847.

17,17-ethylenedioxy-5α-androstane-3-one is used as the starting material. It is prepared from 17,17-ethylenedioxy-5α-androstane-3β-ol by dissolving it in dimethylformamide and oxidizing it with chromic and sulphuric acid.

The 17,17-ethylenedioxy-derivative was reacted with ethyl formate in the presence of sodium hydride or sodium methoxide to yield 2-formyl-17,17-ethylenedioxy-5α-androstane-3-one, which in turn was hydrolized to obtain 2-formyl-5α-androstane-3,17-dione. Both 2-formyl-17,17-ethylenedioxy-5α-androstane-3-one and 2-formyl-5α-androstane-3,17-dione, when dissolved in ethyl alcohol and reduced in the presence of palladium-on-charcoal and HCl as a catalyst, were easily and rapidly converted into 2α-methyl-5α-androstane-3,17-dione, operating at room temperature and normal pressure.

The last compound, upon reaction with pyrrolidine, yielded the corresponding 3-enamine, which through reduction with lithium aluminium hydride was converted into the 17-β-ol-derivative. This, through hydrolysis, yielded the 3-ketone, whereas, through a reaction with hydrazine or amino-guanidine, it yielded the corresponding 3-hydrazones, azines and guanyl-hydrazones.

2α - methyl - 3 - pyrrolidyl - 5α - androst-3-ene-17-one, through reaction with methyl-magnesium bromide, was converted into the 17α-methyl-17β-ol-derivative. This, through hydrolysis, yielded the 3-ketone, whereas, through treatment with hydrazine or amino-guanidine, it yielded the corresponding 3-hydrazones, azines and guanyl-hydrazones.

When the 3-azines, dissolved in pyridine, react with anhydrides of the aliphatic acids containing from 2 to 10 C atoms, they are converted into the 17-esters of these aliphatic acids.

The following is a scheme of the general pattern of the described conversions:

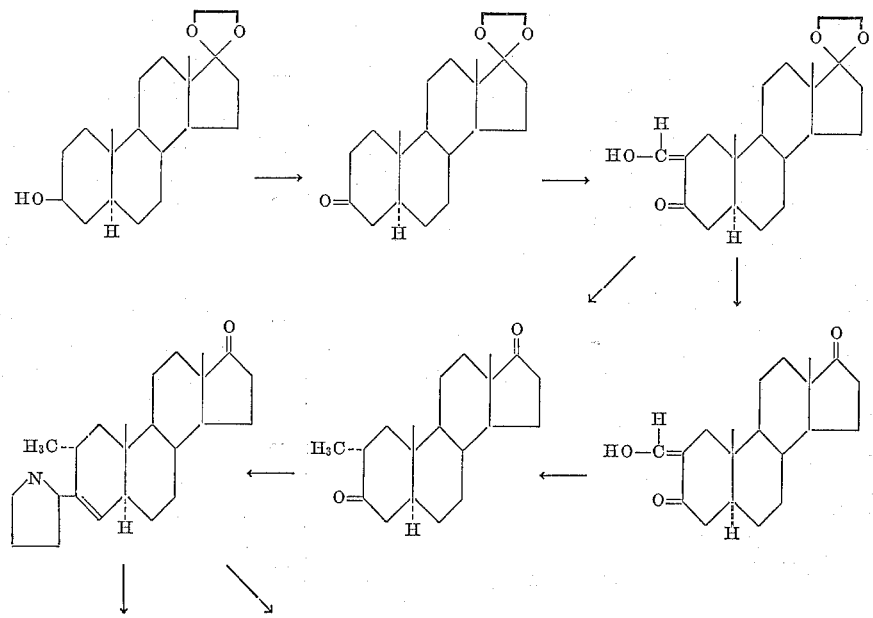

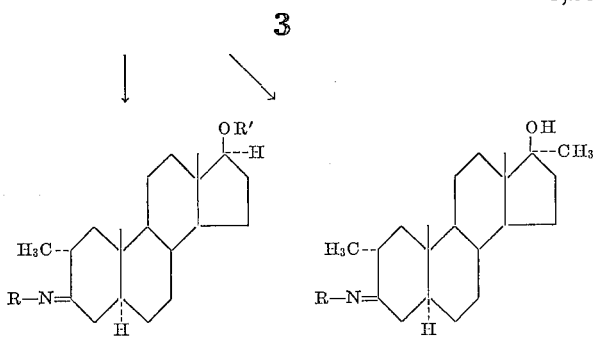

where:

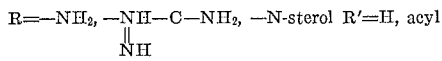

The following examples are given only for the purpose of illustrating the invention and are not to be construed as limiting the annexed claims.

EXAMPLE 1

*17,17-ethylenedioxy-5α-androstane-3-one*

7 parts of 17,17-ethylenedioxy-5α-androstane-3β-ol are dissolved in 200 parts of N,N-dimethyl-formamide. The solution is cooled to 0° C. and 15 parts of a chromo-sulphuric solution are added. (The chromo-sulphuric solution is prepared by dissolving 66.75 parts of chromic anhydride in 50 parts of water, adding 57.5 parts of sulphuric acid of sp. gr.=1.48 and finally diluting with enough water to make a total volume of 250 parts.) After standing 10 minutes, 10 parts of pyridine are added, followed by the addition of a substantial amount of water. The yield is 6.5 parts of 17,17-ethylenedioxy-5α-androstane-3-one, having M.P.=182–185° C. and [α]$_D$=5.5° (chloroform).

EXAMPLE 2

*2-formyl-17,17-ethylenedioxy-5α-androstane-3-one*

A solution of 7 parts of 17,17-ethylenedioxy-5α-androstane-3-one in 140 parts of anhydrous, thiophene-free benzene, through which a stream of nitrogen is passed with stirring, is mixed with 28 parts of ethyl formate and 7 parts of sodium methoxide. After 5 hours it is diluted with ethyl ether and the solution is repeatedly extracted with 350 cc. of water. The combined aqueous extracts are mixed with 35 parts of sodium monophosphate, and extracted with 200 parts of chloroform. The chloroform extract is then evaporated to dryness and the product is recrystallized from acetone. The yield is 5.6 parts of 2-formyl-17,17-ethylenedioxy-5α-androstane-3-one, having M.P.=180–182° C. and [α]$_D$=+16° (chloroform).

EXAMPLE 3

*2-formyl-5α-androstane-3,17-dione*

1 part of 2-formyl-17,17-ethylenedioxy-5α-androstane-3-one is dissolved in 10 parts of 90% acetic acid. The solution is warmed for 20 minutes on a steam-bath. It is then diluted with water and the product, collected by filtration, is recrystallized from acetone. The yield is 0.78 parts of 2-formyl-5α-androstane-3,17-dione, having M.P.=194–196° C.; and [α]$_D$=+120° (chloroform).

EXAMPLE 4

*2α-methyl-5α-androstane-3,17-dione*

5 parts of 2-formyl-17,17-ethylenedioxy-5α-androstane-3-one are dissolved in 180 parts of ethanol and the solution is mixed with 5 parts of 4 N hydrochloric acid. The product is then reduced by means of hydrogen, using 2.5 parts of 10% palladium-on-charcoal as a catalyst. After 2 hours, 740 parts of hydrogen have been absorbed (752 mm./Hg, 28° C.). The catalyst is separated by filtration, and the filtered solution is evaporated to dryness. The product is recrystallized from sulphuric ether. The yield is 3.2 parts of 2α-methyl-5α-androstane-3,17-dione, having M.P.=152–154° C., and [α]$_D$=+104° (chloroform).

EXAMPLE 5

*2α-methyl-3N-pyrrolidyl-5α-androst-3-ene-17-one*

3.5 parts of 2α-methyl-5α-androstane-3,17-dione are refluxed for 24 hours together with 50 parts of benzene, 3.5 parts of pyrrolidine and 0.1 part of p-toluenesulphonic acid. Care is taken to separate the water formed during the reaction. The product is then evaporated to dryness.

The crude 2α-methyl-3N-pyrrolidyl-5α-androst-3-ene-17-one has M.P.=132–139° C.

EXAMPLE 6

*2α,17α-dimethyl-5α-androstane-17β-ol-3-guanyl-hydrazone*

1 part of 2α-methyl-3N-pyrrolidyl-5α-androstane-3-ene-17-one is dissolved in 16 parts of anhydrous benzene and the solution is mixed with 23 parts of a 32.8% solution of magnesium methyl-bromide in ether. After a 4-hour refluxing, care is taken to decompose the unreacted Grignard. The product is then extracted with ether, the ether solution is evaporated to dryness, and the recovered material is refluxed for 1 hr. together with 20 parts of ethanol, 1.28 parts of amino-guanidine carbonate, and 10.6 parts of a 10% solution of KOH in methyl alcohol. After filtration, the solution is partly evaporated, and diluted with water. The product is finally recrystallized from methanol. The yield is 0.9 part of 2α-17α-dimethyl-5α-androstane-17β-ol-3-guanyl-hydrazone, having M.P=223–225° C. and [α]$_D$=+25° (chloroform).

EXAMPLE 7

*2α,17α-dimethyl-5α-androstane-17β-ol-3-hydrazone*

1 part of 2α-methyl-3N-pyrrolidyl-5α-androst-3-ene-17-one is dissolved in 16 parts of anhydrous benzene and the solution is poured into 13 parts of a 32.8% solution of magnesium methyl-bromide in ether. The mixture is refluxed for 4 hours, and care is then taken to decompose the unreacted Grignard reagent. The product is extracted with ether, the ether solution is evaporated to dryness, and the recovered material is refluxed for 2 hours together with 10 parts of ethanol and 0.2 part of 85% hydrazine hydrate. Water is then added and the product is recrystallized from ether. The yield is 0.75 part of 2α,17α-dimethyl-5α-androstane-17β-ol-3-hydrazone, having M.P.=252–256° C. and [α]$_D$=+80° (chloroform).

EXAMPLE 8

*2α,17α-dimethyl-5α-androstane-17β-ol-3-one-azine*

A solution of 1 part of 2α-methyl-3N-pyrrolidyl-5-α-androst-3-ene-17-one in 16 parts of anhydrous benzene is added to 23 parts of a 32.8% solution of methyl-magnesium bromide in ether. After refluxing for 4 hours and decomposing the unreacted Grignard reagent, the product is extracted with ether, the ether extract is evaporated to dryness, and the recovered material is refluxed for 2 hours with 5 parts of ethanol and 0.1 part of 85% hydrazine hydrate. Water is then added and the product is recrystallized from methanol. The yield is 0.52 part of 2α,17α-dimethyl-5α-androstane-17β-ol-3-one-azine, having M.P.=265–267° C. and [α]$_D$=+116° (chloroform).

EXAMPLE 9

*2α,17α-dimethyl-5α-androstane-17β-ol-3-one-azine*

1 part of 2α-methyl-3N-pyrrolidyl-5α-androst-3-ene-17-one is dissolved in 16 parts of anhydrous benzene. The solution is then added with 23 parts of a 32.8% solution of methyl-magnesium bromide and refluxed for 4 hours. The unreacted Grignard reagent is then decomposed, the product is extracted with ether, the ether solution is evaporated to dryness, and the recovered material is refluxed for 4 hours with 10 parts of chloroform and 2 parts of 98% hydrazine hydrate. The chloroform layer is collected, washed with water, and evaporated to dryness. Finally, the product is recrystallized from methanol. The yield is 0.65 part of 2α,17α-dimethyl-5-α-androstane-17β-ol-3-one-azine, having M.P. =265–267° C. and [α]$_D$=+116° (chloroform).

EXAMPLE 10

*2α-methyl-5α-androstane-17β-ol-3-guanyl-hydrazone*

0.5 part of 2α-methyl-3N-pyrrolidyl-5α-androst-3-ene-17-one is dissolved in 10 parts of benzene. 0.5 part of lithium aluminium hydride suspended in 15 parts of anhydrous ether is added to the solution, and the mixture is refluxed for 30 minutes. The unreacted lithium aluminium hydride is decomposed by the addition of ethyl acetate, the aluminum and lithium salts are filtered off, the clear solution is evaporated to dryness, and the crude 2α-methyl-3N-pyrrolidyl-5α-androst-3-ene-17β-ol is refluxed for 2 hours together with 10 parts of ethanol, 0.64 part of amino-guanidine carbonate and 5.3 parts of a 10% solution of KOH in methanol. The potassium carbonate that has formed during the reaction is filtered off, the solution is partly evaporated, a substantial amount of water is added to it, and the product, collected by filtration, is recrystallized from a mixture of methanol and ethyl ether. The yield is 0.34 part of 2α-methyl-5α-androstane - 17β - ol - 3 - guanyl - hydrazone, having M.P. =233–235° C. and [α]$_D$=+35° (chloroform).

EXAMPLE 11

*2α-methyl-5α-androstane-17β-ol-3-hydrazone*

0.5. part of 2α-methyl-3N-pyrrolidyl-5α-androst-3-ene-17-one dissolved in 10 parts of benzene is mixed with 0.5 part of lithium aluminum hydride suspended in 15 parts of anhydrous ether. After refluxing for 30 minutes the unreacted lithium aluminum hydride is decomposed with ethyl acetate, the aluminum and lithium salts are filtered off, the filtered solution is evaporated to dryness, and the crude 2α-methyl-3N-pyrrolidyl-5α-androst-3-ene-17β-ol is refluxed for 2 hrs. with 5 parts of ethanol and 0.1 part of 85% hydrazine hydrate. Water is then added and the product is collected and recrystallized from ether. The yield is 0.37 part of 2α-methyl-5α-androstane-17β-ol-3-hydrazone, having M.P.=199–203° C. and [α]$_D$=+44° (chloroform).

EXAMPLE 12

*2α-methyl-5α-androstane-17β-ol-3-one-azine*

0.5 part of 2α-methyl-3N-pyrrolidyl-5α-androst-3-ene-17-one dissolved in 10 parts of benzene is mixed with 0.5 part of lithium aluminum hydride suspended in 15 parts of anhydrous ether. After refluxing for 30 minutes, the unreacted lithium aluminum hydride is decomposed with ethyl acetate, the lithium and aluminum salts are filtered off, the filtered solution is evaporated to dryness, and the recovered crude 2α-methyl-3N-pyrrolidyl-5α-androst-3-ene-17β-ol is refluxed for 2 hours with 5 parts of ethanol and 0.05 part of 85% hydrazine hydrate. The yield is 0.3 part of 2α-methyl-5-α-androstane-17β - ol - 3 - one - azine, having M.P.=238–239° C. and [α]$_D$=+129° (chloroform).

EXAMPLE 13

*2α-methyl-5α-androstane-17β-ol-3-one-azine*

0.5 part of 2α-methyl-3N-pyrrolidyl-5α-androst-3-ene-17-one dissolved in 10 parts of benzene is mixed with 0.5 part of lithium aluminum hydride suspended in 15 parts of anhydrous ether. After refluxing for 30 minutes, the excess lithium aluminium hydride is decomposed by the addition of ethyl acetate, the aluminum and lithium salts are filtered off, the filtered solution is evaporated to dryness, and the recovered crude 2α-methyl-3N-pyrrolidyl-5α-androst-3-ene-17β-ol is refluxed for 4 hrs. with 5 parts of chloroform and 1 part of 98% hydrazine hydrate.

The chloroform layer is collected and, after washing with water it is evaporated to dryness. Finally, the product is recrystallized from methol. The yield is 0.3 part of 2α-methyl-5α-androstane-17β-ol-3-one-azine, having M.P.=238–239° C. and [α]$_D$=+129° (chloroform).

EXAMPLE 14

*2α-methyl-17β-acetoxy-5α-androstane-3-one-azine*

2 parts of 2α-methyl-5α-androstane-17β-ol-3-one-azine are dissolved in 4 parts of pyridine and the solution is added with 4 parts of acetic anhydride. After standing for 12 hours at room temperature, a substantial amount of water is added, and the product, collected by filtration, is recrystallized from methanol. The yield is 2 parts of 2α-methyl-17β-acetoxy-5α-androstane-3-one-azine, having M.P.=267–269° C. and [α]$_D$=+95° (chloroform).

EXAMPLE 15

*2α-methyl-5α-androstane-17β-ol-propionyloxy-3-one-azine*

1 part of 2α-methyl-5α-androstane-17β-ol-3-one-azine is dissolved in 6 parts of pyridine and the solution is mixed with 3 parts of propionic anhydride. After standing for 12 hours at room temperature a substantial amount of water is added, and the product, collected by filtration, is recrystallized from methanol. The yield is 1.05 parts of 2α-methyl-5α-androstane-17β-propionyloxy-3-one-azine, having M.P.=249–251° C. and [α]$_D$=124° (chloroform).

EXAMPLE 16

*2α-methyl-5α-androstane-17β-heptanoyloxy-3-one-azine*

2 parts of 2α-methyl-5α-androstane-17β-ol-3-one-azine are dissolved in 4 parts of pyridine, the solution is mixed with 2 parts of enanthic anhydride and refluxed for 2 hours. Water is then added, the solvent is steam-distilled, the remaining mixture is extracted wtih chloroform, the chloroform extract is evaporated to dryness, and the recovered product is recrystallized from methanol. The yield is 2.1 parts of 2α-methyl-17β-heptanoloxy-5α-androstane - 3 - one - azine, having M.P.=206–208° C. and [α]$_D$=+112° (chloroform).

EXAMPLE 17

*2α-methyl-5α-androstane-17β-decanoyloxy-3-one-azine*

0.5 part of 2α-methyl 5α-androstane-17β-ol-3-one-azine is dissolved in 5 parts of pyridine, and 0.2 part of capric anhydride are added. The mixture is heated to boiling for 4 hours and then cooled to 0° C. Water is then added, the solvent is steam-distilled, the remaining mixture is extracted with chloroform, the chloroform layer is collected and evaporated to dryness, and the product is finaly recrystallized from methanol. The yield is 0.45 part of 2α-methyl-5α-androstane-17β-decanoyloxy-3-one-azine, having M.P.=194–196° C. and [α]$_D$=+104° (chloroform).

I claim:
1. A process for the preparation of a compound of the formula

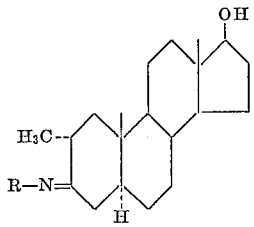

where R is a member selected from the group consisting of —NH$_2$,

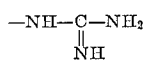

and

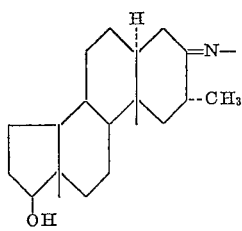

said process comprising reacting 17,17-ethylenedioxy-5α-androstane-3-one with ethyl formate and a condensing agent selected from the group consisting of sodium hydride and sodium methoxide to form 2-formyl-17,17-ethylene-dioxy-5α-androstane-3-one, reducing said 2-formyl compound in the presence of palladium-on-charcoal and hydrochloric acid to form 2α-methyl-5α-androstane-3,17-dione, reacting said 2α-methyl-5α-androstane-3,17-dione with pyrrolidine to form the corresponding 3-pyrrolidyl-3-ene derivative, reacting said 3-pyrrolidyl-3-ene derivative with lithium aluminum hydride to form the corresponding 17-β-ol derivative and reacting said 17-β-ol derivative with a reagent selected from the group consisting of hydrazine hydrate and amino-guanidine to form a compound of the aforementioned fromula.

2. A process as claimed in claim 1 wherein said 17-β-ol derivative is reacted in a mole-to-mole proportion with hydrazine hydrate to form the 3-hydrazone.

3. A process as claimed in claim 1 wherein two moles of said 17-β-ol derivative are reacted with one mole of hydrazine hydrate to form the 3,3'-azine.

4. A process as claimed in claim 3 wherein a solution of said 3,3'-azine in pyridine is reacted with an anhydride of an aliphatic acid containing 2 to 10 carbon atoms to form the 17-ester.

5. A process as claimed in claim 1 wherein said 17,17-ethylenedioxy-5α-androstane-3-one is obtained by oxidizing a solution of 17,17-ethylenedioxy-5α-androstane-3β-ol in dimethyl formamide with chromic acid.

6. A process for the preparation of a compound of the formula

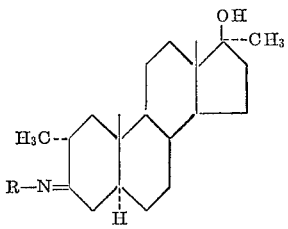

where R is a member selected from the group consisting of —NH$_2$,

—NH—C—NH$_2$
‖
NH and

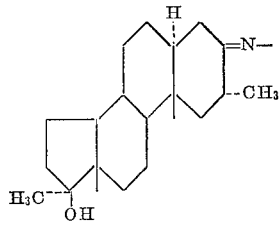

said process comprising reacting 17,17-ethylenedioxy-5α-androstane-3-one with ethyl formate and a condensing agent selected from the group consisting of sodium hydride and sodium methoxide to form 2-formyl-17,17-ethylenedioxy-5α-androstane-3-one, reducing said 2-formyl compound in the presence of palladium-on-charcoal and hydrochloric acid to form 2α-methyl-5α-androstane-3,17-dione, reacting said 2α-methyl-5α-androstane-3,17-dione with pyrrolidine to form the corresponding 3-pyrrolidyl-3-ene derivative, reacting said 3-pyrrolidyl-3-ene derivative with methyl-magnesium bromide to form the corresponding 17α-methyl-17β-ol derivative and reacting said 17α-methyl-17β-ol derivative with a reagent selected from the group consisting of hydrazine hydrate and amino-guanidine to form a compound of the aforementioned formula.

7. A process as claimed in claim 6 wherein said 17α-methyl-17β-ol derivative is reacted in a mole-to-mole proportion with hydrazine hydrate to form the 3-hydrazone.

8. A process as claimed in claim 6 wherein two moles of said 17α-methyl-17β-ol derivative are reacted with one mole of hydrazine hydrate to form the 3,3'-azine.

9. A process as claimed in claim 6 wherein said 17,17-ethylene-dioxy-5α-androstane-3-one is obtained by oxidizing a solution of 17,17-ethylenedioxy-5α-androstane-3β-ol in dimethyl-formamide with chromic acid.

10. 17,17-ethylenedioxy-5α-androstane-3-one.
11. 2-formyl-17,17-ethylenedioxy-5α-androstane-3-one.
12. 2-formyl-5α-androstane-3,17-dione.

References Cited by the Examiner
UNITED STATES PATENTS 2,781,342   2/57   Herr et al. _____ 260—239.5
3,098,850   7/63   Babcock et al. _____ 260—239.5

OTHER REFERENCES

Fieser et al.: Steroids, page 519, 1959 ed., Reinhold Pub. Co., New York, N.Y.

Iriarte et al.: Tetrahedron, vol. 3, pages 28–36 (1958).

LEWIS GOTTS, *Primary Examiner.*

IRVING MARCUS, *Examiner.*